Aug. 19, 1969  F. LAWN  3,462,671
THYRISTOR FIRING CIRCUIT

Filed Dec. 8, 1967  3 Sheets-Sheet 1

INVENTOR.
Francis Lawn
BY Wood, Herron & Evans
ATTORNEYS

INVENTOR.
Francis Lawn
BY
Wood, Herron & Evans
ATTORNEYS

INVENTOR.
Francis Lawn
BY Ford, Herron and Evans
ATTORNEY'S

United States Patent Office 3,462,671
Patented Aug. 19, 1969

3,462,671
THYRISTOR FIRING CIRCUIT
Francis Lawn, Oakhurst, N.J., assignor to Rowan Industries, Inc., Westminster, Md., a corporation of Maryland
Filed Dec. 8, 1967, Ser. No. 689,026
Int. Cl. H02m 1/08
U.S. Cl. 321—18   26 Claims

ABSTRACT OF THE DISCLOSURE

A firing circuit which controls the firing angle of a thyristor; and apparatus for regulating current and/or voltage in which the control system includes as a principal element at least one thyristor, the firing angle of which is controlled by the firing circuit.

BACKGROUND OF THE INVENTION

Figure 1:
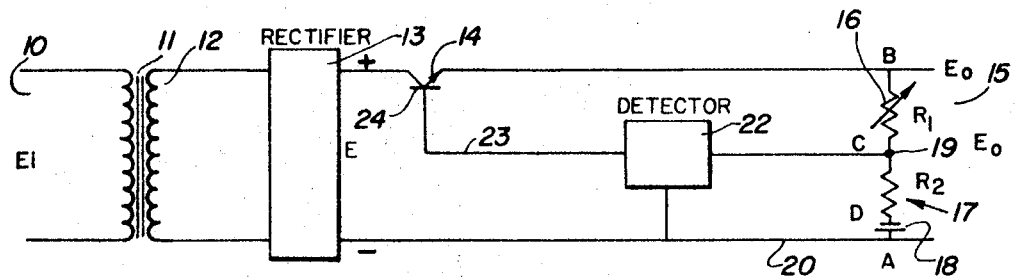

While the firing circuit of this invention, which controls the firing angle of a thyristor, may be used in a variety of circuit environments, for the purpose of illustration the invention is described with respect to its use in a specific environment with which it finds particular utility. Specifically, the firing circuit of this invention is described with respect to its use in controlling the firing angle of a thyristor which forms a component part of a regulated direct current power supply by which a constant voltage or constant current is applied to a load from an unregulated power source.

In a regulated direct current power supply, depending upon the application, a particular voltage or current to be applied to a load is selected, usually by setting a variable resistor in the apparatus. A detector continuously monitors the voltage or current at the load and generates an analog signal when the voltage or current varies from the magnitude which has been preselected. The analog signal is applied to a control element in series with the source, via a control circuit, to shorten or lengthen its conduction angle per AC cycle, and thus vary the magnitude of the RMS current supplied to the load, thereby restoring the load current or voltage to its preselected magnitude. As the series control element, a thyristor or SCR is used which is connected in either the positive or negative line of the power supply. The analog signal output from the detector, when operated upon by the control circuit and applied to the thyristor, effectively varies the firing angle of the thyristor, and thereby regulates the RMS current flowing through the thyristor to the load.

The use of the SCR, or its thyratron predecessor, as the control element for a regulated power supply has been known prior to the present invention as demonstrated, for example, in Patent No. 2,806,963. In these prior systems, the thyratron or SCR has been placed in the alternating current source. The firing grid or gate has been connected to a control transformer whose output is 90 electrical degrees out of phase with the voltage of the source. The direct current voltage level of the output of the control transformer is raised or lowered as required by the detector to vary the firing angle of the thyratron or SCR. This system depends for its control on the fact that the output of the control transformer is at least approximately a sine wave whose magnitude varies with time, as will be explained more completely in the detailed description.

There is a disadvantage to the use of the sine wave voltage of the control transformer to fire the SCR. Because of the upper and lower limits of the magnitude of voltage permitted to be applied to the gate of the SCR and because of its varying slope, the sine wave does not permit accurate control of the firing angle.

It has, therefore, been an objective of the present invention to provide a pulsing circuit which is controlled by the control transformer and which applies a uniform voltage pulse to the SCR gate, the pulse only varying with time to vary the firing angle of the SCR, and hence, the RMS value of load current, in accordance with the magnitude of change demanded by the detector at the output of the power supply.

As will be demonstrated below, the pulsing circuit of the present invention may be employed in a number of applications, for example, in a single phase power supply, a three phase power supply, etc.

Figure 2:
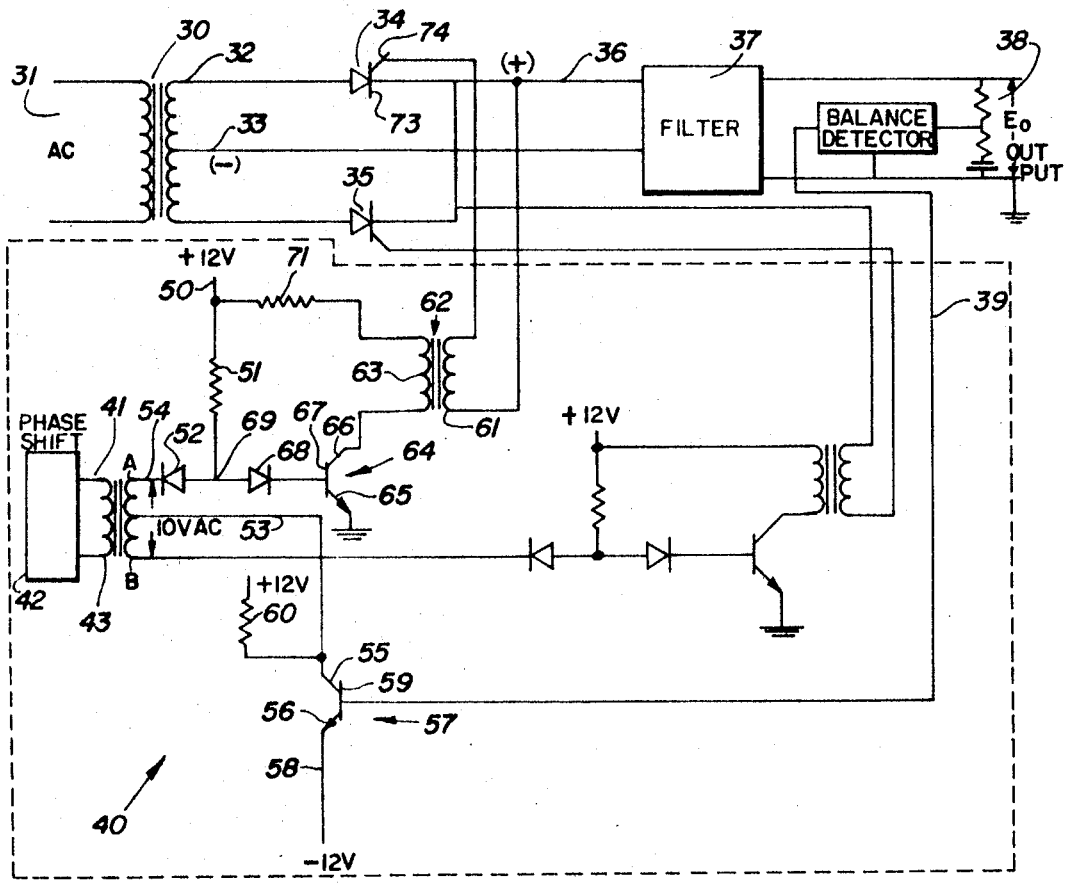
Figure 3:
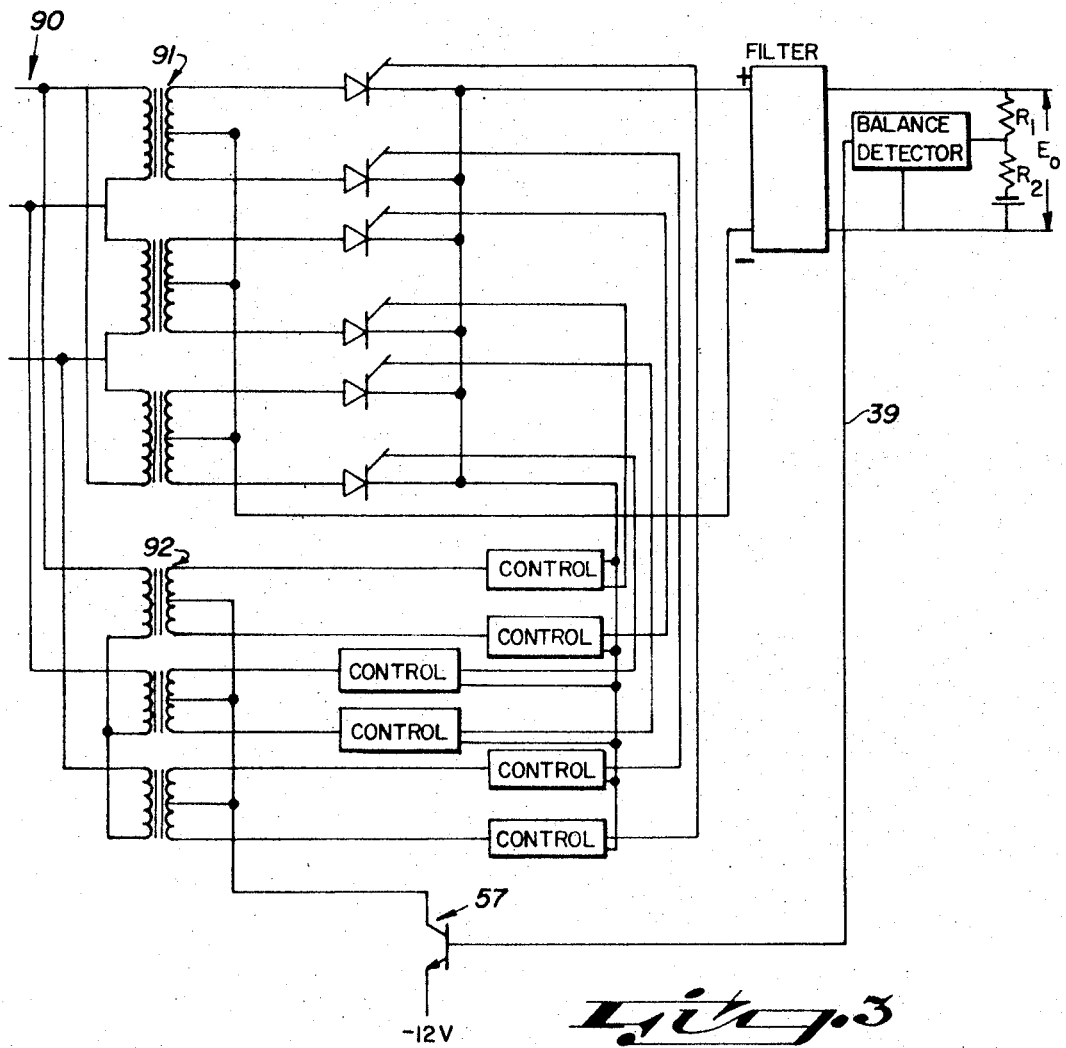
Figure 4:
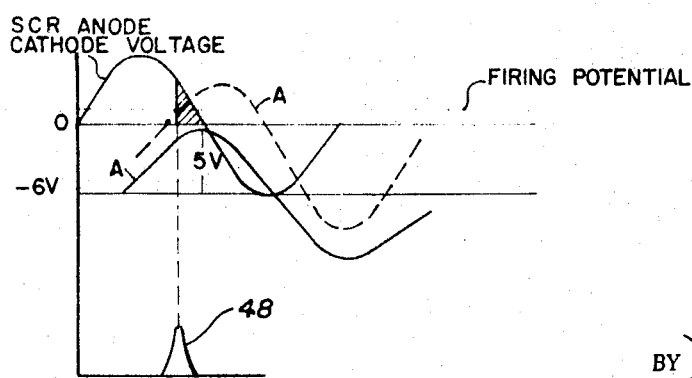
Figure 5:
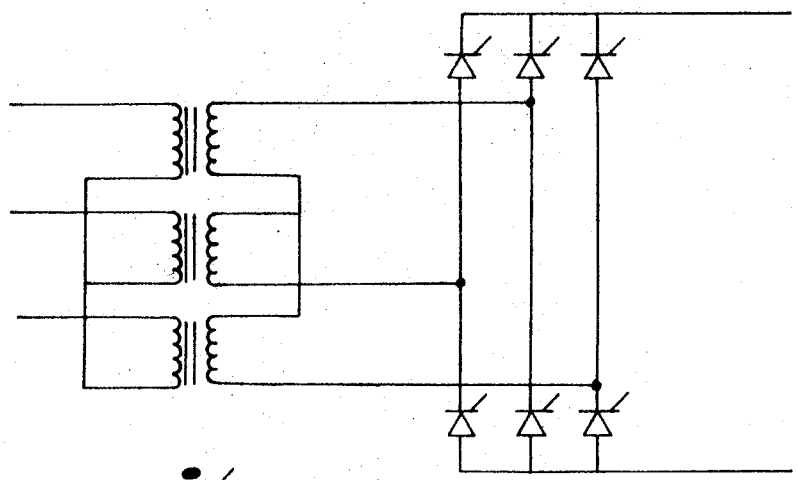
Figure 6:
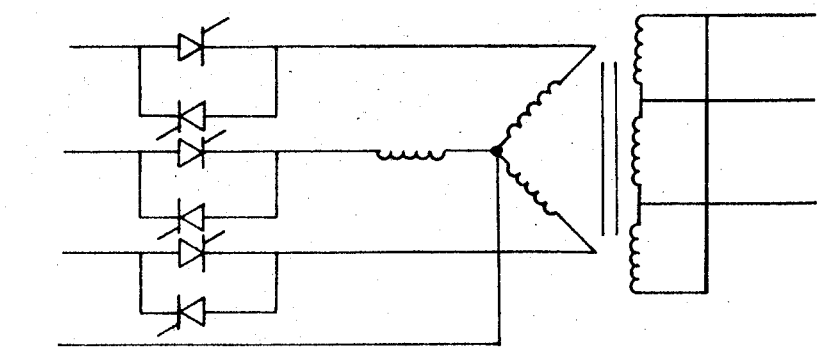
Figure 7:
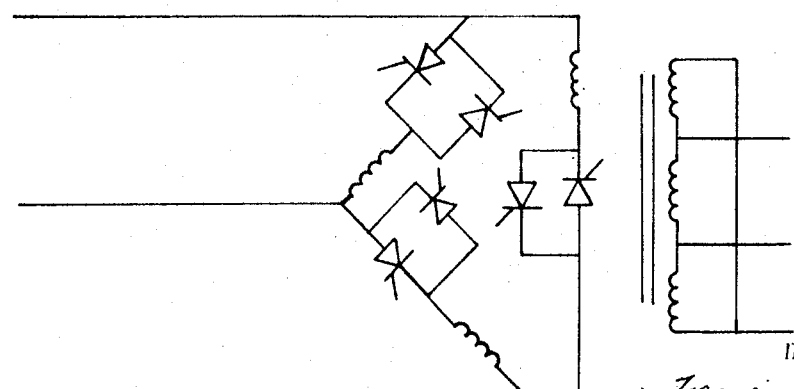

The several features of the present invention will become more readily apparent from the following detailed description taken in conjunction with the accompanying drawings in which:

FIG. 1 is a circuit diagram illustrating a prior art power supply;
FIG. 2 is a circuit diagram illustrating the invention applied to a single phase circuit;
FIG. 3 is a circuit diagram illustrating the invention applied to a three phase circuit;
FIG. 4 is an illustration of the wave forms of the power transformer and control transformer, respectively; and
FIGS. 5, 6 and 7 are diagrammatic illustrations of alternative three phase circuits to which the invention is applicable.

For illustrative purposes, a prior art voltage regulator of the type having a series control element is illustrated in FIG. 1. The voltage regulator has an alternating current input indicated at 10 which is connected to a transformer 11 having a secondary 12. The alternating current from the secondary 12 is rectified by the rectifier 13 and fed through a series control element 14 to the output 15. Across the output 15 is a bridge detector circuit which includes a first resistor 16 which determines the voltage at the output, a second resistor 17 and a reference voltage 18 whose positive terminal is connected to the negative line 20 and whose negative terminal is connected to the resistor 17.

The values of resistance and reference voltage are selected so that the voltage drop across the resistor 16 is equal to the output voltage. Hence the potential at the point 19 between the two resistors is the same as the potential at the negative output line 20.

The balance detector 22 detects any variation in that voltage equation and produces an analog signal through line 23 to base 24 of the series control transistor 14 to increase or decrease the effective resistance of that control element thereby returning the output voltage to the desired value.

While the SCR firing circuit of this invention is illustrated in FIG. 2 in association with a bridge control circuit of the general type illustrated in FIG. 1, it should be understood that the SCR firing circuit of this invention is equally useful in other circuit environments where control of the firing angle is desired.

The circuit illustrated in FIG. 2 includes a power transformer 30 connected to an alternating current input 31, the transformer having a secondary winding 32. The secondary winding is center tapped at 33 to provide the regulator negative output line and is connected through two SCR's or thyristors 34 and 35 to the positive line 36. The rectified current is fed through a filter 37 to the output 38. At the output, a bridge and balance detector of the type described in connection with FIG. 1 is used to detect variations in the output voltage and to feed a corrective analog signal through the line 39. The analog signal at 39 operates through the control network 40 to cause the SCR's to fire at that angle which will produce the desired voltage. This control network includes a control transformer 41 which is connected to the primary of the power transformer 30 through a phase shift circuit 42 of conventional design which shifts the phase at the primary 43 of the control transformer approximately 90 electrical degrees with respect to the phase of the alternating current source.

The direct current level of the output of the control transformer is normally maintained below the potential of the negative terminal 33 of the power supply and regulation of the firing of the SCR's is effected by raising or lowering the level of the direct current voltage of the secondary of the control transformer in response to the analog control signal output from the detector on line 39.

The manner in which the variation of the firing angle of the SCR's is effected is illustrated by reference to the wave forms of FIG. 4. The anode-cathode voltage of the SCR's is illustrated in heavy black and one possible level of the control voltage, applied between the gate and cathode of each SCR, is illustrated in broken lines.

Assume by way of illustration that the anode-cathode voltage of the SCR's is at zero direct current potential and the secondary voltage of the control transformer is at at minus six volt direct current level and has a peak voltage of five volts. Under these conditions, the SCR's cannot conduct. If the direct current voltage level can be raised to that indicated at A, the SCR will fire at that point at which the control voltage crosses the level of the firing potential of the SCR as indicated by the shaded area. It can easily be seen that further changes in the level of the control voltage will cause further variations in the firing angle and consequently variations in the RMS value of the regulated current. It can also be noted that when the peak control voltage barely crosses the firing potential of the SCR, the firing lacks precision due to the breadth or low angle of slope of the control voltage curve.

The control circuit of the present invention is to provide greater precision in the regulation of the firing angle by providing for the application of a voltage pulse or spike having a substantially vertical slope at the SCR gate, the angle of firing of the pulse being determined by the DC level of the control voltage. Such a wave form is illustrated at 48 in FIG. 4.

In the control circuit as shown in FIG. 2, the control of the voltage level of the secondary of the control transformer (and hence control of the firing angle of the SCR's) is provided by the circuit from the positive 12 volt line 50 through dropping resistor 51, diode 52, center tap 53 through the secondary 54 and the collector 55 to emitter 56 of transistor 57 to the negative-12 volt line 58, the collector 55 also being connected through a resistor 60 to the positive line 50. The transistor 57 has a base 59 which is connected to the output of the balance detector indicated at 39. A firing pulse is developed at the secondary 61 of a transformer 62 whose primary 63 is connected between the 12 volt line and ground through a transistor 64 having an emitter 65 and a collector 66. The transistor has a base 67 connected to a diode 68, the anode of the diode 68 being connected to the low side of the dropping resistor 51 indicated at 69. A resistor 71 is connected in series with the primary 63 to limit the magnitude of the current through the primary.

The secondary of the firing transformer 62 is connected across the cathode 73 and gate electrode 74 of the SCR 34.

A similar circuit connected to the opposite side of the secondary 54 of the control transformer is connected to the opposite SCR 35.

The operation of the control circuit is as follows:

When the point A of control transformer secondary 54 is below ground level, current will flow through the dropping resistor 51 and the diode 52 to the center tap 53. As the instantaneous value of the point A swings above ground potential, the current through the dropping resistor 51 decreases and the potential of point 69 will rise. When the level of the potential of the point 69 is sufficiently high, the diode 68 will conduct, thereby switching the 12 volt supply to the base of the transistor 64 causing it to fire very rapidly. The magnitude of the current through the transistor 64 by way of the primary 63 of transformer 62 causes the transformer to saturate and cease conducting.

Thus, after the secondary transmits a spike of voltage to the gate of SCR 34, the voltage immediately disappears from the secondary and the transformer is ready to recycle.

The firing angle of this spike is varied by varying the potential on the base of the transistor 57. The voltage applied to the base of the transistor 57 determines its resistive effect and causes greater or less current to flow through the resistor 60 and hence the level of voltage about which the secondary of control transformer operates. The voltage on the base of the transformer 59 is, as indicated, controlled by the balance detector. Therefore, the firing angle of the SCR's 34 and 35 is directly controlled by the pre-selected values of the detector bridge network.

In the preferred embodiment of the invention depicted in FIG. 2, the firing angle of the spike is varied by varying the potential on the base of the transistor 57 in response to analog output of the detector. If the SCR firing angle control circuit of this invention is used in an environment in which an analog signal, such as the detector output, is not present, the firing angle of the spike can be varied by providing a variable resistor or potentiometer in place of the emitter-collector path of transistor 57. With a potentiometer connected between the negative 12 volt line 58 and the junction of resistor 60 and the control transformer secondary winding center tap line 53, variation of the potentiometer resistance by, for example, manual control, effectively alters the potential of the center tap line 53. Variation of the potential of the center tap line 53, in turn, effectively varies the firing angle of the spike. Thus, the firing angle of the SCR can be varied manually by a potentiometer adjustment, as well as automatically in response to an analog signal such as provided by the detector.

The invention can be applied equally well to a three phase system as illustrated in FIG. 3. For the purpose of illustration, the detector network and the manner in which the control signal is applied to the base of the transistor 57 is identical to that described in connection with the single phase system of FIG. 2. In FIG. 3, however, there is a three phase source indicated at 90 connected to the delta connected primary of a three phase transformer 91. Each phase of the secondary of the transformer 91 is center tapped and the center taps are connected together to form the negative side of the output of the regulator. Each phase of the secondary is also connected through SCR's and tied together to form the positive output of the power supply. The output of the secondary, because of the center tap connection, is a six phase star.

The control system includes a three phase control transformer 92 whose primary winding is connected in wye to provide a 30 degree phase shift from the phase primary of the power transformer 91.

The secondary windings are center tapped, and the center taps are connected to the collector of the transistor 57. Each side of each phase of the secondary is connected through a control circuit of the type described in connection with FIG. 2, the control circuit being connected across the gate and cathode of an appropriate SCR in the power transformer.

As in the case of the primary transformer, the center tap connection provides a six phase star output from which it is possible to select a sequence of six phases each 60 degrees apart. By adding to them the 30 degree phase shift effected between the delta connected primary of the power transformer and the wye connected primary of the control transformer, the required 90 degree phase shift between control windings and the respective SCR is attained.

A number of variants from the power supply illustrated diagrammatically in FIG. 3 are possible. For example, the SCR's may be placed in the primary circuit of the power transformer rather than the secondary as illustrated. Other connections of the SCR's to the power transformer are possible as illustrated in FIGS. 5, 6 and 7. In each case the control network for firing the SCR's has been omitted for simplicity, it being understood that the angle of firing of the SCR's would be controlled by applying the principles illustrated and described in connection with FIGS. 2–4.

In FIG. 5, the SCR's are connected as a full wave rectifier bridge. While this circuit is functionally satisfactory, it does require the current of each phase to pass through two SCR's thereby doubling the SCR power loss.

In FIG. 6 the SCR's are in a wye connected primary circuit and do not provide rectification. This circuit will therefore require rectification.

FIG. 7 is similar to FIG. 6 except that the primary is delta connected.

What is claimed is:

1. In a power supply for supplying regulated DC current or voltage to a load from an AC source, said power supply having a detector for detecting a variation in the load current or voltage and developing a control signed at its output responsive to such variation, means for varying the unregulated current from said source in response to said control signal comprising:
    a plurality of SCR's in series with said AC source, each SCR having an anode, a cathode and a gate;
    a control transformer having a primary connected to said source and a secondary having an approximately sine wave AC output approximately 90° out of phase with said AC source;
    means normally maintaining a reference level of DC voltage;
    means connected between said detector output and said control transformer output for varying the DC level of said transformer output relative to said reference level in response to said control signal, said means causing a crossing of said reference level by said AC output, the cyclical position of said crossing varying with the DC level of the output voltage of the control transformer;
    means connecting said transformer output across the cathode and gate of each said SCR;
    said connecting means including means for converting said AC output to a voltage spike whose cyclical position varies with the DC level of voltage of the control transformer.

2. A power supply according to claim 1 in which said connecting means comprises
    a DC voltage source having positive and negative terminals;
    said positive terminal being connected to said negative terminal through a resistor, a first diode, the secondary of said control transformer and a variable resistance control element, said control element being connected to the output of said detector;
    a second diode having its anode connected to the first diode and circuit means connecting said second diode to said SCR gate.

3. A power supply according to claim 2 in which said circuit means to said SCR gate comprises
    a transistor having a base connected to the cathode of said second diode,
    a pulse transformer having a secondary connected across the gate and cathode of said SCR,
    means connecting the emitter and collector of said transistor in circuit with the primary of said pulse transformer to transmit a voltage pulse when said second diode transmits current to said transistor base.

4. A power supply according to claim 3 in which said diodes have their anodes connected to said positive terminal, and said transistor having one of its emitter and collector connected to the same DC potential as said AC source.

5. A power supply according to claim 1 in which said control transformer has a center tapped secondary, said center tap being connected to a variable resistance control element,
    said detector output being connected to said control element to vary its resistance.

6. A power supply according to claim 5 in which said control transformer has a secondary whose output terminals are each connected through a fixed resistance to a positive DC potential,
    said control element being a transistor having an emitter, collector and base,
    said secondary having a center tap connected in series with said emitter, collector and a negative DC potential,
    said detector output being connected to the base of said transistor
    whereby variation in the potential applied to said base will vary the level of DC potential of said secondary.

7. A power supply according to claim 6 in which said source has at least two SCR's controlling the flow of current therefrom,
    one SCR being connected to one side of said secondary and the other SCR being connected to the other side of said secondary.

8. A power supply according to claim 1 in which said AC source is three phase and said control transformer is three phase,
    at least two SCR's connected to each phase of said source to control the current therefrom,
    said control transformer having secondaries having output terminals and interconnected center taps, said center taps being connected to said means for maintaining the DC level of output of said control transformer, and
    said connecting means connecting each SCR to an output terminal of said control transformer.

9. An SCR firing circuit for controlling the firing angle of an SCR having an anode and a cathode series connected with an AC source and having a gate, said SCR firing circuit comprising:
    a control transformer having a primary connected to said AC source and a secondary having an approximate sine wave AC output approximately 90 electrical degrees out of phase with said AC source;
    means normally maintaining a reference level of DC voltage;
    means connected to said control transformer output for varying the DC level of said output relative to said reference level, said means causing a crossing of said reference level by said AC output, the cyclical position of said crossing varying with the DC level of the output voltage of the control transformer; and
    means connecting said control transformer output across the cathode and gate of said SCR, said connecting means including means for converting said AC output to a voltage spike whose cyclical position varies with the DC level of the output of said transformer.

10. The control circuit of claim 9 in which said connecting means comprises:
    a DC source having positive and negative terminals, said positive terminal being connected to said negative terminal through a first diode, the secondary of said control transformer and a variable resistance control element; and
    a second diode having its anode connected to the first diode, and
    circuit means connecting said second diode to said SCR gate.

11. The control circuit of claim 10 in which said circuit connecting means comprises:

a transistor having a base connected to the cathode of said second diode;

a pulse transformer having a secondary connected across the gate and cathode of said SCR; and means connecting the emitter and collector of said transistor in circuit with the primary of said transformer to transmit a voltage pulse when said second diode transmits current to said transistor base.

12. A control circuit according to claim 11 further including a first resistor having one terminal connected to said positive terminal and having another terminal connected to said control transformer and said variable resistance control element.

13. The control circuit of claim 12 in which said variable resistance control element is the collector-emitter path of a second transistor, the emitter-collector resistance of which is variable in response to an analog electrical signal applied to the base thereof.

14. In a power supply for supplying regulated DC current or voltage to a load from an AC source, said power supply having a detector for detecting a variation in the load current or voltage and developing a control signal at its output responsive to such variation, means for varying the unregulated current from said source in response to said control signal comprising:

a plurality of SCR's in series with said AC source, each SCR having an anode, a cathode and a gate;

a control transformer having a primary connected to said source and a secondary having an analog AC output;

means normally maintaining a reference level of DC voltage;

means connected between said detector output and said control transformer output for varying the DC level of said transformer output relative to said reference level in response to said control signal, said means causing a crossing of said reference level by said AC output, the cyclical position of said crossing varying with the DC level of the output voltage of the control transformer;

means connecting said transformer output across the cathode and gate of said SCR, said connecting means including means for converting said AC output to a voltage spike whose cyclical position varies with the DC level of voltage of the control transformer.

15. A power supply according to claim 14 in which said connecting means comprises:

a DC voltage source having positive and negative terminals;

said positive terminal being connected to said negative terminal through a resistor, a first diode, the secondary of said control transformer and a variable resistance control element said control element being connected to the output of said detector;

a second diode having its anode connected to the first diode and circuit means connecting said second diode to said SCR gate.

16. A power supply according to claim 15 in which said circuit means to said SCR gate comprises:

a transistor having a base connected to the cathode of said second diode;

a pulse transformer having a secondary connected across the gate and cathode of said SCR;

means connecting the emitter and collector of said transistor in circuit with the primary of said pulse transformer to transmit a voltage pulse when said second diode transmits current to said transistor base.

17. A power supply according to claim 16 in which said diodes have their anodes connected to said positive terminal, and said transistor having one of its emitter and collector connected to the same DC potential as said AC source.

18. A power supply according to claim 14 in which said control transformer has a center tapped secondary, said center tap being connected to variable resistance control element;

said detector output being connected to said control element to vary its resistance.

19. A power supply according to claim 18 in which said control transformer has a secondary whose output terminals are each connected through a fixed resistance to a positive DC potential;

said control element being a transistor having an emitter, collector and base;

said secondary having a center tap connected in series with said emitter, collector and negative DC potential;

said detector output being connected to the base of said transistor whereby variation in the potential applied to said base will vary the level of DC potential of said secondary.

20. A power supply according to claim 19 in which said source has at least two SCR's controlling the flow of current therefrom, one SCR being connected to one side of said secondary and the other SCR being connected to the other side of said secondary.

21. A power supply according to claim 14 in which said AC source is three phase and said control transformer is three phase;

at least two SCR's connected to each phase of said source to control the current therefrom;

said control transformer having secondaries having output terminals and interconnected center taps, said center taps being connected to said means for maintaining the DC level of output of said control transformer; and said connecting means connecting each SCR to an output terminal of said control transformer.

22. An SCR firing circuit for controlling the firing angle of an SCR having an anode and a cathode series connected with an AC source and having a gate, said SCR firing circuit comprising:

a control transformer having a primary connected to said AC source and a secondary having an approximate sine wave AC output approximately 90 electrical degrees out of phase with said AC source;

means normally maintaining a reference level of DC voltage;

means connected to said control transformer output for varying the DC level of said output relative to said reference level, said means causing a crossing of said reference level by said AC output, the cyclical portion of said crossing varying with the DC level of the output voltage of the control transformer; and means connecting said control transformer output across the cathode and gate of said SCR, said connecting means including means for converting said AC output to a voltage spike whose cyclical position varies with the DC level of the output of said transformer.

23. The control circuit of claim 22 in which said connecting means comprises:

a DC source having positive and negative terminals, said positive terminal being connected to said negative terminal through a first diode, the secondary of said control transformer and a variable resistance control element; and a second diode having its anode connected to the first diode, and circuit means connecting said second diode to said SCR gate.

24. The control circuit of claim 23 in which said circuit connecting means comprises:

a transistor having a base connected to the cathode of said second diode;

a pulse transformer having a secondary connected across the gate and cathode of said SCR; and means connecting the emitter and collector of said transistor in circuit with the primary of said transformer to transmit a voltage pulse when said second diode transmits current to said transistor base.

25. A control circuit according to claim 24 further including a first resistor having one terminal connected to said positive terminal and having another terminal connected to said control transformer and said variable resistance control element.

26. The control circuit of claim 25 in which said variable resistance control element is the collector-emitter path of a second transistor, the emitter-collector resistance of which is variable in response to an analog electrical signal applied to the base thereof.

References Cited

UNITED STATES PATENTS

| | | | |
|---|---|---|---|
| 3,176,212 | 3/1965 | De Puy | 321—18 XR |
| 3,213,351 | 10/1965 | Walker | 321—18 |
| 3,218,540 | 11/1965 | Jackson | 321—18 |
| 3,243,689 | 3/1966 | Perrins | 321—18 XR |
| 3,273,043 | 9/1966 | Clark et al | 321—18 |
| 3,348,122 | 10/1967 | Todd | 321—18 |
| 3,375,428 | 3/1968 | Mitchell | 321—18 |

JOHN F. COUCH, Primary Examiner

W. M. SHOOP, JR., Assistant Examiner

U.S. Cl. X.R.

321—47; 323—22, 24